W. V. TURNER.
DUPLEX PRESSURE CONTROL APPARATUS.
APPLICATION FILED NOV. 1, 1907.
997,523.
Patented July 11, 1911.
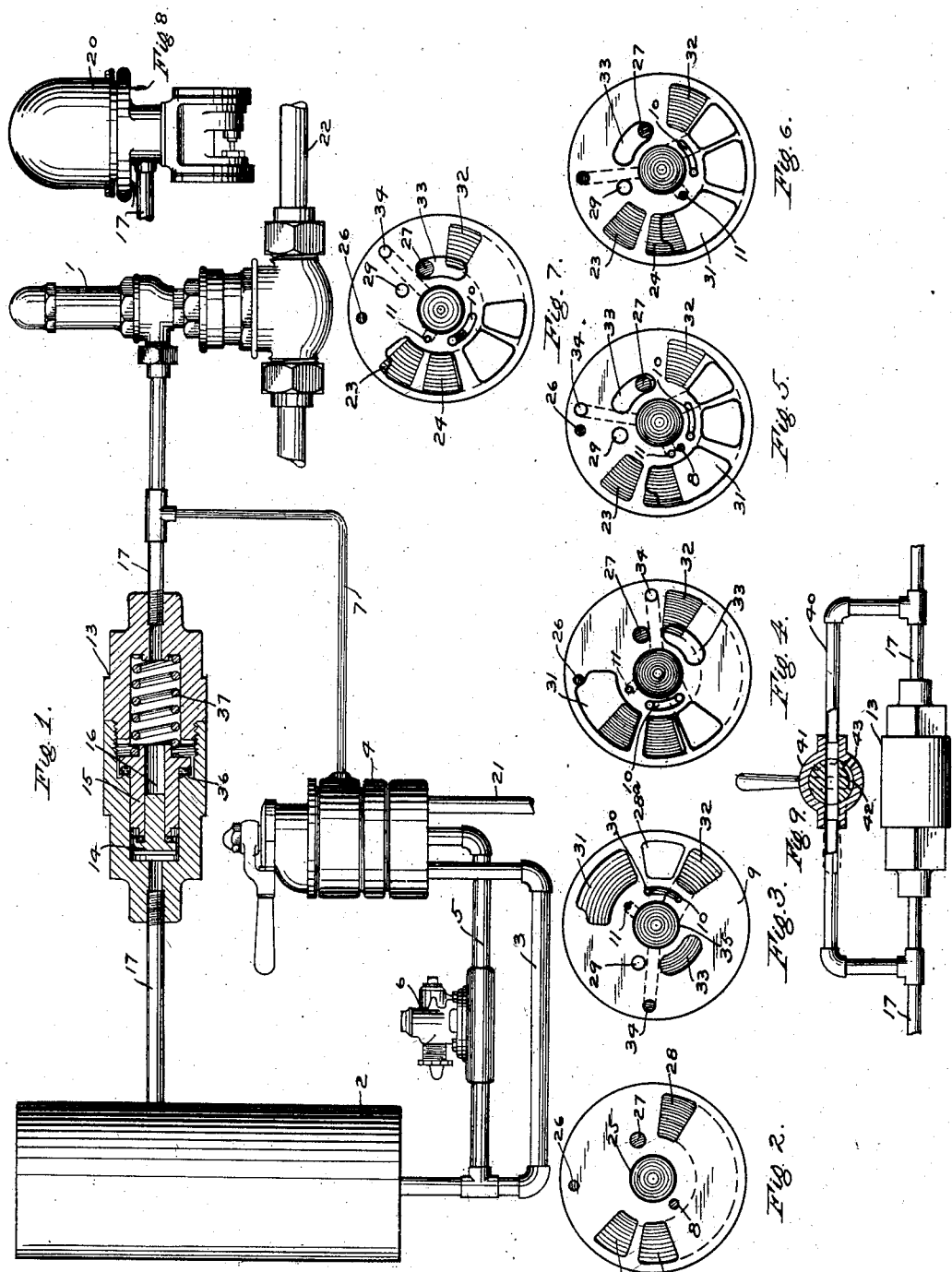
WITNESSES
INVENTOR
Walter V. Turner
by E. A. Wright
Att'y.

UNITED STATES PATENT OFFICE.

WALTER V. TURNER, OF EDGEWOOD, PENNSYLVANIA, ASSIGNOR TO WESTINGHOUSE AIR BRAKE COMPANY, OF PITTSBURG, PENNSYLVANIA, A CORPORATION OF PENNSYLVANIA.

DUPLEX PRESSURE-CONTROL APPARATUS.

997,523. Specification of Letters Patent. Patented July 11, 1911.

Application filed November 1, 1907. Serial No. 400,179.

*To all whom it may concern:*

Be it known that I, WALTER V. TURNER, a citizen of the United States, residing at Edgewood, in the county of Allegheny and State of Pennsylvania, have invented new and useful Improvements in Duplex Pressure-Control Apparatus, of which the following is a specification.

This invention relates to fluid pressure brakes, and more particularly to apparatus whereby either one of two different maximum degrees of pressure may be obtained in the main reservoir of the brake system or other storage reservoir, as desired.

Duplex regulation of the main reservoir pressure for air brake systems, has heretofore been obtained by employing two pump governors, or a pump governor having two regulating portions, one being adjusted to give a higher degree of main reservoir pressure than the other, and the one set for the low pressure being connected up to the engineer's brake valve in such a manner as to be cut in in the release and the running positions, but cut out in the service and the lap positions of said brake valve.

It is often desirable, in the running of railway trains, to operate the brake system at one time at the ordinary or low degree of pressure, such as a maximum main reservoir pressure of 90 pounds and a maximum train pipe pressure of 70 pounds, and at another time at a higher degree of pressure, such as a maximum main reservoir pressure of 120 pounds, and a maximum train pipe pressure of 90 pounds, such as in high speed service. For this latter purpose also, two regulating portions for the pump governor have heretofore been provided, together with a cock or other means for cutting the low pressure regulating portion into or out of action.

The main object of my present invention is to provide means for obtaining duplex regulation of the reservoir pressure in connection with a single pump governor of any standard form, whether applied to an air pump driven by steam, electric, or other form of motor.

Another object of my improvements is to provide a simple and improved means for obtaining two different maximum degrees of pressure in the main reservoir at will.

My invention consists broadly of an excess pressure or reducing valve for supplying air from the main reservoir, at a reduced pressure, to the pressure head of the governor, to obtain the desired excess pressure in the main reservoir, and means for admitting full main reservoir pressure to said head, when it is desired to obtain the ordinary low maximum degree of pressure in the main reservoir.

In the accompanying drawing, which illustrates a preferred form of my improvements, Figure 1 is a diagrammatic view of a portion of a locomotive air brake apparatus with my invention applied thereto and shown partly in section; Fig. 2 a plan view of the seat for the rotary valve of the engineer's brake valve illustrated in Fig. 1; Fig. 3 a face view of the rotary valve, showing the location of ports and cavities; Figs. 4 to 7 inclusive, diagrammatic views illustrating the relative positions of the ports in the engineer's brake valve in release, lap, service and running positions respectively; Fig. 8 an elevation of one form of electric pump governor, which may also be employed in connection with my improvements; and Fig. 9 is a diagrammatic view of one form of my invention, as employed where it is desired to operate the brake system at one time at a low degree of pressure, and another time at a higher degree of pressure.

According to the construction illustrated in Fig. 1 of the drawing, my improvements may be applied in connection with apparatus comprising a steam pump governor 1, of any desired construction, for controlling the supply of steam, through steam pipe 22, to a steam pump, and a main reservoir 2, into which air is compressed by the pump. The reservoir 2 is connected by a direct pipe 3 to the rotary valve chamber of an engineer's brake valve 4, and may also have another connection, by way of pipe 5, which opens to port 23 in the valve seat of the rotary valve, and which contains a feed valve 6, for limiting the normal degree of pressure admitted to the train pipe 21 to the desired degree, in the usual manner. The valve seat of the engineer's brake valve 4 is preferably provided with the following ports; inlet port 23, for air at train pipe pressure, admitted through the feed valve 6 and pipe 5, train pipe port 28, feed port 24, leading to the train pipe port or passage, exhaust port 25, leading to the atmosphere, preliminary discharge port 26, communicating with the customary equalizing reservoir, and equalizing port 27, also leading to the equalizing reservoir. The rotary valve 9 may be provided with through ports 28ª and 29, and cavities 31, 32, 33 and 34. The cavities 32 and 34 are open through passages in the rotary valve to the central cavity 35. The above ports are as customarily provided in an engineer's brake valve of this type, and in addition, I provide a port 8 in the rotary valve seat, which communicates through pipe 7 with pipe 17, leading to the pressure head of the pump governor 1. The rotary valve 9 is provided with a through port 30, opening into a cavity 10, which is adapted to register with port 8 in running and release position of the brake valve, and thereby admit air at main reservoir pressure from the rotary valve chamber, in said positions, to the pressure head of the governor. The rotary valve 9 may also be provided with a cavity 11, which is connected by a passage in the rotary valve to the central cavity 35, and this cavity is adapted to register with port 8, in the service position of the brake valve.

Interposed in the pipe 17, which leads from the main reservoir 2 to the pressure head of the governor 1, is an excess pressure or reducing valve 13, of any desired construction, through which air may be admitted to the pressure head of the governor at a predetermined degree less than the pressure in the main reservoir. The excess pressure valve 13 preferably consists of a valve 15, having a seat 36, against which a spring 37, adjusted to the predetermined degree less than the main reservoir pressure, tends to seat the valve.

In the running position, Fig. 7, and in the release position, Fig. 4, the cavity 10, connected with through port 30, registers with port 8, and the pressure head is then subjected to fluid at full main reservoir pressure and the pump is controlled accordingly and the governor operates in the same manner as the usual standard type of pump governor.

In service position, Fig. 6, the exhaust cavity 11 registers with the port 8, so that fluid in pipe 17 and on the pressure head of the governor is vented to the atmosphere, thereby causing the governor to admit full head of steam to the pump, which then compresses air with full force into the reservoir. The rotary valve being then moved to lap position, Fig. 5, the port 8 is lapped, and the pressure head of the governor is subject to fluid at the reduced pressure, as determined by the excess pressure valve 13. It will now be apparent that the pump will continue to compress air into the main reservoir until the pressure therein is in excess, according to the predetermined degree of pressure for which the excess pressure valve is adjusted. For an example, assuming that the governor spring is adjusted to 90 pounds, and the excess pressure valve at 30 pounds, then when the pressure on the spring side of the excess pressure valve and on the pressure head of the governor has attained 90 pounds, at which the governor is adjusted to cut out the pump, the pressure on the main reservoir side of the excess pressure valve and in the main reservoir will be 120 pounds. If the brake valve should be turned to a position in which the port 8, leading to the pipe 7, is lapped or closed, fluid under pressure would then be bottled up in the pipe 17, and should this pressure exceed the main reservoir pressure at any time, it would interfere with the normal operation of the governor, by its action on the pressure head thereof. In order to prevent this, I may provide a return passage way between the pressure head and the main reservoir, containing a check valve, so that any excess pressure on said pressure head equalizes through the check valve to the main reservoir. For this purpose I preferably provide a passage way 16 through the excess pressure valve 15, having a check valve 14 adapted to seat, so as to prevent air from the reservoir flowing to the governor pressure head.

In Fig. 8 I have illustrated one form of electric pump governor 20, with which my improvements may also be employed, the pipe 17 being connected in a similar manner, as before described, to the pressure head of the governor.

Where it is desired to operate the brake system at one time at the ordinary or low degree of pressure, and at another time at a higher degree of pressure, I preferably provide a construction such as diagrammatically illustrated in Fig. 9 of the drawings, wherein is employed a by pass pipe 40, connecting the two portions of pipe 17 around the excess pressure valve 13. The pipe 40 is provided with a cock 41 for controlling communication therethrough. It will now be seen that in one position of the cock 41, as shown in Fig. 9, air is admitted to the governor head, through pipe 40, at main reservoir pressure, so that the brake system may be operated at the ordinary or low degree of pressure. If it is desired to operate at the higher degree of pressure, the cock 41 is turned to close communication through the pipe 40, so that air is supplied to the pressure head of the governor through the excess pressure valve device and the corresponding higher degree of pressure is maintained in the main reservoir, as hereinbefore described. The cock 41 may also be provided with a cavity 42, and an exhaust port 43, so arranged that upon movement of the cock to its closed position, the cavity 42 momentarily connects the pressure head side of pipe 17 with the exhaust port 43, thereby venting the fluid contained therein and on the pressure head of the governor. This prevents the sealing of fluid under pressure on the governor pressure head and also causes the governor to operate to admit full head of steam to the pump, thus insuring prompt starting action of the pump to raise the pressure in the main reservoir to the predetermined higher degree.

It will be understood that my improvements may be employed in connection with various types of single pump governors for electric, steam or other form of pump motor.

It will now be apparent that I have provided a simple construction wherein a single pump governor is utilized to obtain at will, one of two different maximum degrees of pressure in the main or storage reservoir.

Having now described my invention, what I claim as new and desire to secure by Letters Patent is:—

1. In a duplex pressure control apparatus, the combination with a fluid pressure pump governor, normally subject to the pump pressure, of means for subjecting said governor to a degree of pressure different from the pump pressure.

2. In a duplex pressure control apparatus, the combination with a fluid pressure pump governor, normally governed by pump pressure, of means for subjecting said governor to a less degree of pressure than the pump pressure.

3. In a duplex pressure control apparatus, the combination with a storage reservoir and a fluid pressure governor for controlling the action of a pump for compressing fluid into said reservoir, of means for subjecting said governor at one time to fluid at reservoir pressure to control the operation of the governor, and at another time to pressure at a predetermined degree less than reservoir pressure.

4. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and means for controlling the admission of fluid at reservoir pressure to said governor.

5. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and an engineer's brake valve for admitting fluid at reservoir pressure to said governor in one position.

6. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and an engineer's brake valve for admitting fluid at reservoir pressure to said governor in a position for releasing the brakes.

7. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and an engineer's brake valve for admitting fluid at reservoir pressure to said governor in running and release positions.

8. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and an engineer's brake valve for admitting fluid at reservoir pressure to said governor in running and release positions thereof, and for closing said communication in brake application position.

9. In a duplex pressure control apparatus, the combination with a fluid pressure pump governor and a storage reservoir into which the pump compresses fluid, of a reducing or excess pressure valve for admitting fluid from said reservoir to the governor at a predetermined degree less than reservoir pressure, and an engineer's brake valve for admitting fluid at reservoir pressure to said governor in running and release positions thereof, for closing said communication in service and service lap positions, and for connecting said governor to the atmosphere in service position.

10. In a duplex pressure control apparatus, the combination with a storage reservoir and a fluid pressure governor for a pump adapted to compress fluid into said reservoir, means for admitting fluid at reservoir pressure to the governor pressure head, a reducing valve for supplying fluid to the governor head at a pressure less than the reservoir pressure, and means for relieving the pressure head of pressure in excess of reservoir pressure.

11. In a duplex pressure control apparatus, the combination with a storage reservoir and a fluid pressure governor for a pump adapted to compress fluid into said reservoir, means for admitting fluid at reservoir pressure to the governor pressure head, a reducing valve for supplying fluid to the governor head at a pressure less than the reservoir pressure, and a check valve, permitting the flow of air from the pressure head to the reservoir, for relieving the pressure head of pressure in excess of reservoir pressure.

12. A duplex pressure control device for pumps comprising a governor having a single regulating portion and means for varying the pressure thereon.

In testimony whereof I have hereunto set my hand.

WALTER V. TURNER.

Witnesses:
R. F. EMERY,
WM. M. CADY.

Copies of this patent may be obtained for five cents each, by addressing the "Commissioner of Patents, Washington, D. C."